(No Model.)
M. MORAN.
METHOD OF MAKING BOLTS.
No. 469,261. Patented Feb. 23, 1892.
*Fig. I.*      *Fig. II*      *Fig. III.*
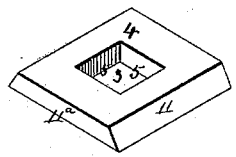
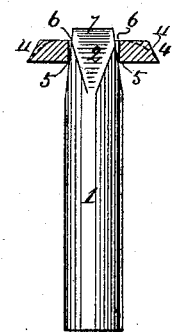
*Fig. IV.*      *Fig. V.*
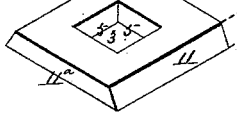
*Fig. VI.*
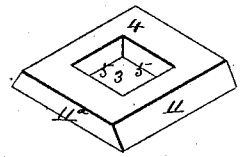
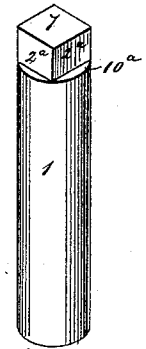
*Fig. VIII.*
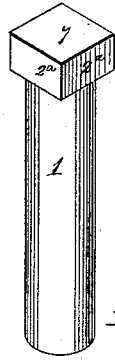
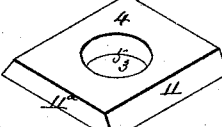
*Fig. VII.*
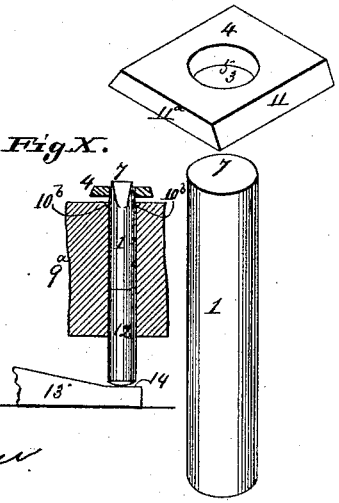
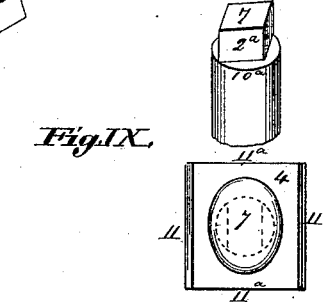
*Fig. IX.*
*Fig. X.*
Attest:
Harry S. Rohrer
S. Cotton
Inventor:
Michael Moran,
By Knight Bros.
Attys.

UNITED STATES PATENT OFFICE.

MICHAEL MORAN, OF ST. LOUIS, MISSOURI.

METHOD OF MAKING BOLTS.

SPECIFICATION forming part of Letters Patent No. 469,261, dated February 23, 1892.

Application filed April 15, 1891. Serial No. 389,004. (No model.)

*To all whom it may concern:*

Be it known that I, MICHAEL MORAN, of the city of St. Louis, in the State of Missouri, have invented a certain new and useful Improved Method of Making Bolts, of which the following is a full, clear, and exact description, reference being had to the accompanying drawings, forming part of this specification.

The method consists in forming the shank or stem and the head in two pieces. The shank may be simply a piece of round iron having a length equal to or a little in excess of the whole length of the finished bolt, or it may be swaged at the end, so as to fit a square or other non-circular orifice in the head, as will be described. The head is preferably made by cutting rectangular sections or pieces from a flat bar made with beveled or curved edges, as set forth, the sections being punched with a hole to receive the end of the shank, said hole being punched either before or after the head has been cut from the bar. The shank is held in a die by clamping-jaws and the head is attached by riveting the end of the shank over the head by pressure or concussion of a roller, die, or hammer.

Figure I is a perspective view of the shank and head detached. Fig. II shows the shank in side view and the head in diametric section. Fig. III is a side elevation showing the bolt in clamp-jaws and the head upon the riveted end of the shank, part of a swaging-roller being shown by dotted lines. Figs. IV, VI, VII, and VIII are perspective views showing different modifications of the shank and head, the parts being detached. Fig. V shows the head upon the shank, the head being in diametric section and the shank in side view, the modification being that shown in Fig. IV. Fig. IX is a top view of the head of the bolt. Fig. X is a section showing the shank held in a socket-die.

The process of manufacture applies to the various forms and will be first described in connection with the form shown in Figs. I, II, and III.

The shank 1 (see Figs. I and II) is made of round iron and is tapered at the end by four flat spots or bevels 2, so as to fit the square central hole 3 of the bolt-head 4. The lower edge 5 of the hole fits tight against the shank; but where the hole is made of the same size from top to bottom, as seen in the drawings, there will be space 6 between the shank and the head, as seen in Fig. II. This space is filled by the expansion of the end 7 of the shank when the end is swaged or riveted by the pressure or blow of the die or other tool 8 used in riveting. A roller may be used for the purpose, as indicated by dotted lines in Fig. III.

9 are clamping or gripping jaws that are forced against the shank of the bolt by any suitable means. The jaws take hold of the shank preferably a little below the under side of the head and hold it so firmly that when the die 8 descends upon the end 7 of the shank the shank is forced through the clamps until the bolt-head rests upon the clamp-jaws, and a bead 10 is formed upon the shank to give bearing for the inner side of the head. The jaws are made with a recess at the upper corner or edge to allow the formation of the bead and to give it suitable shape. (See Fig. III.)

The head 4 may be placed on the shank either before or after the latter is gripped by the jaws. In the form shown in Figs. IV and V the end of the shank is compressed, the flat spots $2^a$ being parallel with the sides of the bolt, forming a shoulder $10^a$, against which rests the lower edge 5 of the bead.

In the form shown in Fig. VI the end of the shank is upset, so as to form a square end, as shown.

In the modification shown in Fig. VII the shank is round from end to end and the shank-hole 3 in the head is of the same character and size.

In the modification shown in Fig. VIII the end of the shank is compressed to a diamond form and the head made with a similar orifice 3. In Fig. IX the end of the shank is flattened, as indicated by dotted lines.

No attempt has been made to show every form that may be given to the end of the shank to occupy the orifice 3 of the head, as the special form has no bearing on the principle of the invention. The head is preferably made by cutting from a flat bar rolled with flat or rounded bevels, so as to leave on the head two beveled edges 11 and two square or butted edges $11^a$, the former leaving a desirable finish and the latter giving means for the application of a wrench. The rounded bevels are indicated by dotted lines in Figs. II and III. The orifices 3 may be punched either before or after the heads are cut from the bar, (see Fig. IV,) where part of the punched bar is shown by dotted lines.

In Fig. X a solid die 9ᵃ is shown, into which the shank 1 is dropped either before or after the head has been put on. 12 is a pin stopping the lower end of the socket and forming the rest for the lower end of the shank. The lower end of the pin rests upon a sliding incline 13, by which the pin is forced up to lift the shank in its socket, so that the bolt may be removed by any suitable tool or appliance. The incline has a flat part 14, on which the pin bears when at rest. It will be seen that a bead 10ᵃ will be formed on the shank directly beneath the head, as the head is not in contact with the die and the part between the head and the die will be expanded in the attaching of the head, filling the recess 10ᵇ at the upper end of the socket.

In making bolts by machinery, as the head is formed from the substance of the shank it has not been found feasible to make the heads as large as required for many uses, especially in cases where the head bears against woodwork. In my improved process there is practically no limit to the size of the heads.

I claim as new and of my invention—

1. The described method of constructing bolts, by setting the shank 1 in a clamping die or jaws 9, placing the perforate head 4 upon the shank either before or after clamping the shank, and riveting the head upon the shank by concussion or pressure, substantially as set forth.

2. The described method of making bolts, consisting in forming the shank and head in separate pieces adapted to be fitted together, as described, clamping the shank in a die or jaws, with space between the die or jaws and the head, and riveting the end of the shank over the head, thus forcing the shank downward in a die or jaws and forming a bead 10 thereon beneath the head, substantially as set forth.

3. The described method of making bolts, consisting in forming the heads 4 from a bar rolled with beveled edges 11, from which the heads are cut, said heads being punched to receive the end of the shank 1, clamping the shank in a die or jaws 9, and riveting the head to the shank, substantially as set forth.

MICHAEL MORAN.

In presence of—
J. M. MAROT,
THOS. KNIGHT.